April 10, 1928.
P. W. DIETER
1,665,807
LOCK NUT
Original Filed Feb. 1, 1927
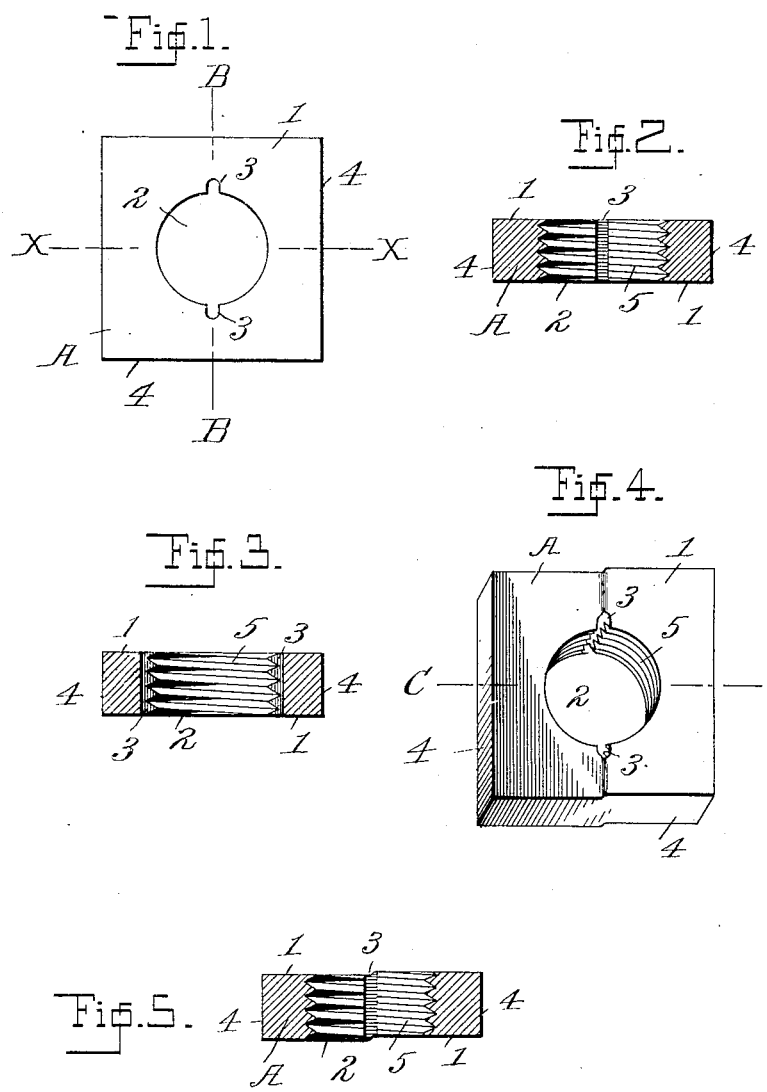

Patented Apr. 10, 1928.

1,665,807

UNITED STATES PATENT OFFICE.

PAUL W. DIETER, OF NEW YORK, N. Y.

LOCK NUT.

Application filed February 1, 1927, Serial No. 165,132. Renewed October 27, 1927.

This invention relates to improvements in lock nuts of the kind that will be self-locking or binding, without being dependent upon any auxiliary devices or expedients, when practically applied to its component member.

The object of the present invention is to produce a nut that will have all the advantages of a standard nut, plus the merits of a lock nut, at the same time produce a lock nut that will meet the accepted standards set for practicability of operation and economy of production.

Another object of the invention is to make a nut wherein all threads thereof will have an equal value in their locking action when said nut is applied to its component member.

The important feature of this invention resides in offsetting on an axial plane in equal proportions, the threads of the nut, after said nut has been cut, punched and threaded in the usual manner. The offsetting of said nut threads is accomplished by first punching a plurality of axial grooves entirely through said nut at a trifle greater depth than the depth of the thread, and then on the line of the grooves, pressing one half or portion of the nut out of facial alinement with the other half or portion of said nut. Pressing the nut out of facial alinement will cause the threads on one side of said grooves to be slightly offset from the threads on the other side of said grooves, so that when the threads on the bolt are forced into engagement with said offset threads, the nut will be firmly held on the bolt in the desired manner.

In the accompanying drawings:

Figure 1 is a plan view of the nut before it is punched, threaded and grooved.

Figure 2 is a transverse section of the same on the line X—X of Figure 1.

Figure 3 is a transverse section on the line B—B of Figure 1.

Figure 4 is a perspective view of the top of the nut.

Figure 5 is a transverse section taken on the line C—C of Figure 1.

In the construction and application of this invention, the standard form of nut blank is used, here shown as square. The first operation on the nut blank A is to punch therein in the usual manner between the working faces 1—1, the central bore 2, after which said blank has a plurality of axial grooves 3 punched, cut or otherwise made through the body thereof between the bore 2 and the sides 4 and extending from one working face to the other. The blank is now in condition to be screw threaded in the manner shown at 5.

After the nut blank has been punched, the axial grooves cut therethrough and the nut threaded in the desired manner, one half or portion of each working face 1 of said nut, on a transverse plane and on a line with the axial grooves, is engaged by any suitable means, such as co-acting members moving in opposite directions, and pressed or forced away from each other in a manner to slightly offset one half or portion of the nut and threads with the other half or portion of the nut and threads on each side of said axial grooves. The degree of offset required to produce the desired result is just sufficient to cause the bolt to bind against the threads of the nut when said nut is forced onto the bolt.

Of course it should be understood that the means employed to offset one half or portion with relation to the other half or portion of the nut, will not in any manner change the pitch, depth or form of the threads in either offset half or portion of said nut, nor will the proportions of the bore of the nut be changed, said offsetting means acting only to slightly offset the threads with relation to each other on each side of the axial grooves.

The axial grooves do not have to be of any predetermined depth or width to effect the intended purpose, but practical demonstrations of the results to be obtained have proven that the proportions shown are best suited to accomplish the desired results.

The offset formation of the nut threads is just sufficient to cause a binding effect upon the bolt threads, but not enough to interfere with the perfect action of the nut when the same is applied to the bolt.

By offsetting in the manner and the proportions shown, all the threads in one half or portion of the nut from the threads in the other half or portion of said nut, a uniform and definite locking value is obtained from all threads of said nut when it is applied to the bolt.

The present form of nut in its general formation and configuration conforms in every particular to the recognized standards as to size, pitch and shape.

The offset formation of the threads of the nut does not prevent said nut from being readily and easily applied to the end of the bolt, and with sufficient grip to permit the immediate and free use of a wrench. The application and removal of the nut to and from the bolt can be made an indefinite number of times without affecting the permanency of its locking efficiency.

I claim:

1. A nut having a threaded opening therein and grooves extending axially through said nut on opposite sides of the threaded opening, with definite portions of said nut pressed in opposite directions to offset the threads on one side of said grooves with the threads on the other side of said grooves.

2. A nut having a threaded opening therein and grooves, approximately the depth of the threads, extending axially through said nut at opposite sides of the opening with equal portions of said nut pressed in opposite directions to offset the threads on one side of said grooves with the threads on the other side of said grooves.

PAUL W. DIETER.